(12) United States Patent
Jin et al.

(10) Patent No.: US 10,931,814 B2
(45) Date of Patent: Feb. 23, 2021

(54) SERVICE RECOMMENDATION (71) Applicant: Advanced New Technologies Co., Ltd., Grand Cayman (KY)

(72) Inventors: Huajing Jin, Hangzhou (CN); Jianbo Zhou, Hangzhou (CN); Shu Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/802,189

(22) Filed: Feb. 26, 2020

(65) Prior Publication Data
US 2020/0382630 A1 Dec. 3, 2020

Related U.S. Application Data

(63) Continuation of application No. PCT/CN2020/070817, filed on Jan. 8, 2020.

(30) Foreign Application Priority Data

May 28, 2019 (CN) .......................... 201910451703.9

(51) Int. Cl.
*H04M 1/725* (2006.01)
*H04W 4/80* (2018.01)

(52) U.S. Cl.
CPC ......... *H04M 1/72569* (2013.01); *H04W 4/80* (2018.02)

(58) Field of Classification Search
CPC combination set(s) only.
See application file for complete search history.

(56) References Cited

U.S. PATENT DOCUMENTS

| 7,559,034 B1* | 7/2009 | Paperny ............. G06F 9/44526 345/629 |
| 10,070,246 B2 | 9/2018 | Jung et al. |
| 2007/0255662 A1* | 11/2007 | Tumminaro .......... G06Q 20/10 705/79 |
| 2009/0119190 A1* | 5/2009 | Realini ................. G06Q 20/04 705/30 |

(Continued)

FOREIGN PATENT DOCUMENTS

| CN | 104601207 | 5/2015 |
| CN | 105933846 | 9/2016 |

(Continued)

OTHER PUBLICATIONS

PCT International Search Report and Written Opinion in International Application No. PCT/CN2020/070817, dated Apr. 9, 2020, 21 pages (with machine translation).

(Continued)

*Primary Examiner* — Ganiyu A Hanidu
(74) *Attorney, Agent, or Firm* — Fish & Richardson P.C.

(57) ABSTRACT

A method includes: receiving, at a terminal, a first signal transmitted by a service device using a first near-field communication technology; obtaining, by an application client executing on the terminal, characteristic information of the service device from the first signal; determining, based on the characteristic information, a target service corresponding to the service device, in which the target service is determined from a plurality of services provided by the application client on the terminal; receiving, at the terminal, a second signal transmitted by the service device using a second near-field communication technology, in which a maximum transmission range of the second signal is less than a maximum transmission range of the first signal; and responsive to receiving the second signal, recommending the target service to a user of the terminal.

21 Claims, 3 Drawing Sheets (56) References Cited

U.S. PATENT DOCUMENTS

| | | | | |
|---|---|---|---|---|
| 2010/0112944 | A1* | 5/2010 | Toshimitsu | H04W 12/02 |
| | | | | 455/41.2 |
| 2011/0070834 | A1* | 3/2011 | Griffin | G06K 7/087 |
| | | | | 455/41.1 |
| 2012/0003933 | A1 | 1/2012 | Baker et al. | |
| 2013/0095751 | A1* | 4/2013 | Kasslin | H04L 63/1466 |
| | | | | 455/41.1 |
| 2015/0126115 | A1* | 5/2015 | Yun | H04N 1/32117 |
| | | | | 455/41.1 |
| 2016/0012465 | A1* | 1/2016 | Sharp | G06Q 20/384 |
| | | | | 705/14.17 |
| 2017/0068953 | A1* | 3/2017 | Kim | G06Q 20/382 |
| 2017/0156061 | A1* | 6/2017 | Hamada | H04W 76/30 |
| 2019/0102774 | A1* | 4/2019 | Koeppel | G06Q 20/367 |
| 2019/0303219 | A1* | 10/2019 | Yuan | G06F 9/452 |

FOREIGN PATENT DOCUMENTS

| | | | | |
|---|---|---|---|---|
| CN | 106297777 | | 1/2017 | |
| CN | 106487998 | | 3/2017 | |
| CN | 106896994 | | 6/2017 | |
| CN | 107194689 | | 9/2017 | |
| CN | 107392586 | | 11/2017 | |
| CN | 108564359 | | 9/2018 | |
| CN | 108811178 | | 11/2018 | |
| CN | 109166203 | | 1/2019 | |
| CN | 109309911 | | 2/2019 | |
| CN | 109584430 | | 4/2019 | |
| CN | 109615367 | | 4/2019 | |
| CN | 110166985 | | 8/2019 | |
| WO | WO2016179704 | | 11/2016 | |
| WO | WO 2018068645 | * | 4/2018 | G06F 9/452 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

FIG. 4

# SERVICE RECOMMENDATION

CROSS-REFERENCE TO RELATED APPLICATIONS

This application is a continuation of PCT Application No. PCT/CN2020/070817, filed on Jan. 8, 2020, which claims priority to Chinese Patent Application No. 201910451703.9, filed on May 28, 2019, and each application is hereby incorporated by reference in its entirety.

TECHNICAL FIELD

One or more implementations of the present specification relate to the field of computer information processing technologies, and in particular, to a service arousing method and an application client.

BACKGROUND

With the rapid development of e-commerce, functions of e-commerce platform and acceptable services are more diversified. When users use a service, they need to look for the service from numerous services. In particular, a livelihood service is hidden deeply in a client of an e-commerce platform, making it difficult for new users to find the service, and it is inconvenient for old users to locate the service. Therefore, how to facilitate users in finding services they need is a problem that needs to be urgently alleviated.

SUMMARY

One or more implementations of the present specification describe a service arousing method and an application client, so that service arousal may be initiated in advance, and the service can be recommended to a user in time when the user needs the service.

According to a first aspect, a service arousing method is provided, where the method is applied to an application client and includes: obtaining characteristic information of a service device from a first signal, where the first signal is a signal transmitted by the service device based on a first near field communication technology; determining the service acceptable to the service device based on the characteristic information, and determining, based on the service acceptable to the service device, a service required by a user from a plurality of services provided by the application client; and recommending the required service to the user when a second signal is received, where the second signal is a signal transmitted by the service device based on a second near field communication technology, and a maximum transmission range of the second signal is less than a maximum transmission range of the first signal.

In an implementation, the first signal is one of the following types:
Bluetooth signal, Wi-Fi signal, or ZigBee signal.
In an implementation, the second signal is any one of the following types:
NFC signal, radio frequency identification signal, or IrDA signal.
In an implementation, the first signal is a signal encrypted based on a preset encryption rule, and the application client is preset with the preset encryption rule; and obtaining characteristic information of a service device from a first signal includes: decrypting the first signal based on the preset encryption rule to obtain the characteristic information.

In an implementation, recommending the required service to the user includes: displaying entry information or a service page of the required service on a running interface of the application client.

In an example, displaying entry information or service page of the required service on a running interface of the application client includes: floating, from a first side of the application interface, the entry information or service page of the required service, where the first side is any one of the following: top, left, right, or bottom.

In an implementation, the service device is any of the following types: subway gate, bus code reader, parking machine, or toll machine.

According to a second aspect, a service arousing method is provided, where the method is applied to an application client and includes: obtaining characteristic information of a subway gate from a first signal, where the first signal is a signal transmitted by the subway gate based on a first near field communication technology; determining a service acceptable to the subway gate based on the characteristic information, and determining, based on the service acceptable to the subway gate, a subway travel service from a plurality of services provided by the application client; recommending the subway travel service to the user when a second signal is received, where the second signal is a signal transmitted by the subway gate based on a second near field communication technology, and a maximum transmission range of the second signal is less than a maximum transmission range of the first signal.

According to a third aspect, a service arousing application client is provided, where the application client is installed on a terminal and includes: an acquisition unit, configured to obtain characteristic information of a service device from a first signal, where the first signal is a signal transmitted by the service device based on a first near field communication technology; a determining unit, configured to determine a service acceptable to the service device based on the characteristic information, and determine, based on the service acceptable to the service device, the service required by the user from a plurality of services provided by the application client; and a recommending unit, configured to recommend the required service to the user when a second signal is received, where the second signal is a signal transmitted by the service device based on a second near field communication technology, and a maximum transmission range of the second signal is less than a maximum transmission range of the first signal.

According to a fourth aspect, a computer readable storage medium is provided, where the medium stores a computer program, and when the computer program is executed on a computer, the computer is enabled to perform the method according to the first aspect.

According to a fifth aspect, a computing device is provided, including a memory and a processor, where the memory stores executable code, and when the processor executes the executable code, the method according to the first aspect is implemented.

According to the method and the application client provided in the implementations of the present specification, service arousal can be initiated in advance before the user uses the service. When the user needs to use the service, the service may be recommended to the user in time, thereby reducing the waiting time of the user and improving user experience.

BRIEF DESCRIPTION OF DRAWINGS

To describe the technical solutions in the implementations of the present invention more clearly, the following briefly introduces the accompanying drawings required for describing the implementations. Clearly, the accompanying drawings in the following description are merely some implementations of the present invention, and a person of ordinary skill in the field may still derive other drawings from these accompanying drawings without creative efforts.

DESCRIPTION OF IMPLEMENTATIONS

The solutions provided in the present specification are described below with reference to the accompanying drawings.

Service platforms such as ALIPAY provide more and more services, such as living payment services, wealth management services, traffic travel services, etc. The traffic travel services can include subway travel service, bus travel service, parking payment service, expressway toll service, etc. In addition, because the e-commerce platforms provide a large number of services, users need to find a service when they need it. For example, in the subway entering scenario shown in FIG. 1, the user needs to start the application client of the related service platform and enter the subway travel service page for card swiping or code sweeping to enter a subway station. When a client of the service platform can provide many services, the user needs to spend time to find the subway travel service page, making user experience worse.

According to one solution, for a terminal that supports Near Field Communication (NFC), the service can be aroused based on an NFC signal received from a service device, to enter the service page. A transmission distance of the NFC signal is less than 0.1 m. Therefore, the NFC signal can be received only when the terminal and the service device are very close to each other, and then the service arousal is started, which takes some time. Therefore, in the NFC-based service arousing method, after putting the terminal close to the service device, the user needs to wait for a period of time before accessing the service page, resulting in poor user experience.

The implementations of the present specification provide a service arousing method. In this method, when the terminal is relatively far away from the service device, service arousal can be triggered to arouse a service in advance; then, when the terminal is close to the service device, the required service is recommended to the user; and when the user needs to user the service, the user can access the service page in time, thereby improving the user experience.

Figure 2:
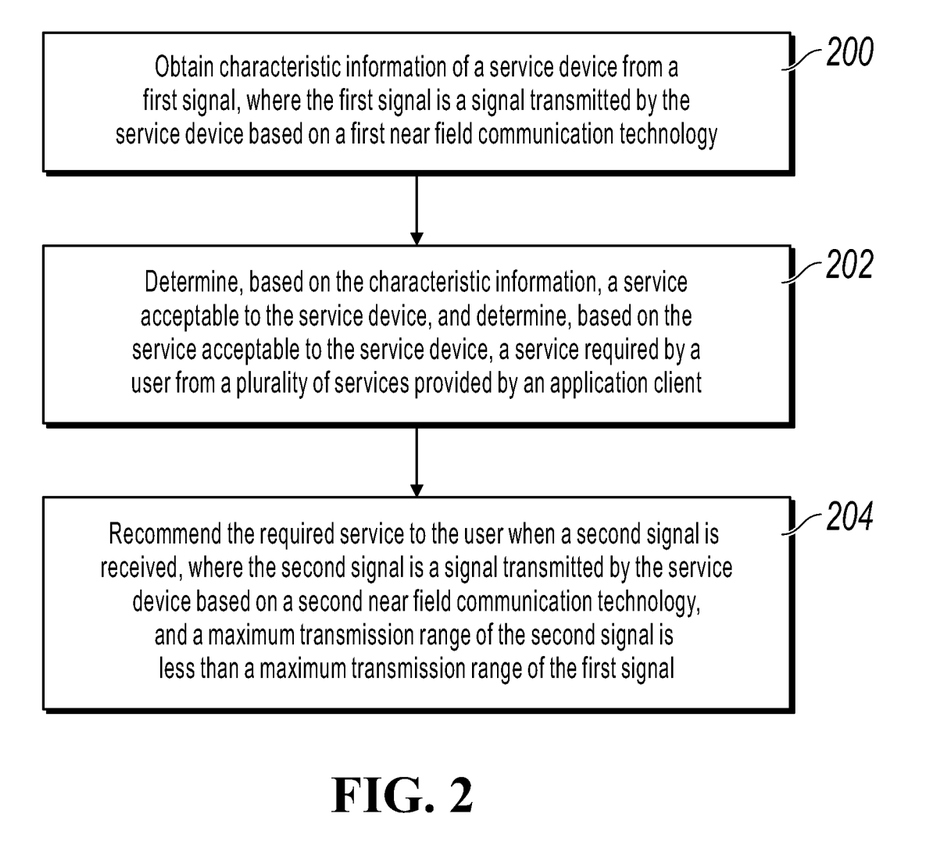
FIG. 2 is a flowchart illustrating a service arousing method, according to an implementation.

Next, the service arousing method provided in the implementations of the present specification is described in detail with reference to FIG. 2. The method may be performed by an application client installed on a terminal, the application client may be a client of a service platform, and the terminal may be a mobile terminal such as a mobile phone or a tablet computer. As shown in FIG. 2, the method includes the following steps. Step 200: Obtain characteristic information of a service device from a first signal, where the first signal is a signal transmitted by the service device based on a first near field communication technology; Step 202: Determine, based on the characteristic information, a service acceptable to the service device, and determine, based on the service acceptable to the service device, the service required by the user from a plurality of services provided by the application client; and Step 204: Recommend the required service to the user when the second signal is received, where the second signal is a signal transmitted by the service device based on a second near field communication technology, and a maximum transmission range of the second signal is less than a maximum transmission range of the first signal.

Next, the previous steps are described in detail with reference to specific examples.

First, in step 200, the characteristic information of the service device is obtained from the first signal, where the first signal is a signal transmitted by the service device based on the first near field communication technology.

The service device can transmit signals based on the first near field communication technology continuously or at a fixed time interval (for example, 1 second, 0.5 second, or 0.3 second), where the signals carry the characteristic information of the service device.

The first near field communication technology may be Bluetooth (specifically Bluetooth low energy, two-way Bluetooth, iBeacon, etc.), Wi-Fi, ZigBee, etc. An effective transmission distance of a Bluetooth signal or a Wi-Fi signal is several meters to dozens of meters, and even hundreds of meters. An effective transmission distance of a ZigBee signal is tens of meters to hundreds of meters. Therefore, when a terminal is far away from a service device, the terminal can receive a signal that is transmitted by the service device based on the first near field communication technology, so that the application client can obtain the characteristic information of the service device, and then trigger service arousal.

When the application client on the terminal is in a running state (including a background running state), once receiving the signal transmitted by the service device based on the first near field communication technology, the terminal can obtain the signal, where the signal is the first signal, and then obtain the characteristic information of the service device from the signal.

If the terminal has received one or more signals that are transmitted based on the first near field communication technology, the application client is started. In this case, the first signal may be the first near field communication technology signal recently received after the application client is started.

In an example of this implementation, there is a correspondence between the service device and the application client; specifically, the same encryption rule is preset for both the service device and the application client. Based on the encryption rule, the service device can encrypt the signal transmitted based on the first near field communication technology. After obtaining the first signal, the application client can decrypt the first signal based on the encryption rule, so that the characteristic information of the service device can be obtained.

Next, in step 202, a service acceptable to the service device is determined based on the characteristic information, and the service required by the user is determined, based on the service acceptable to the service device, from a plurality of services provided by the application client.

The service device can be specifically a subway gate, a bus code reader, a parking machine, an expressway toll machine, etc. Different service devices have different characteristic information. The application client can identify the service device according to the characteristic information of the service device, and then can determine the service acceptable to the service device.

It can be easily understood that when a terminal is located near a service device, the service acceptable to the service device is generally the service required by a user of the terminal. For example, when the user is located near a subway gate, the user generally needs the subway travel service. Therefore, the service required by the user can be determined, based on the service acceptable to the service device, from a plurality of services provided by the application client.

In step 204, the required service is recommended to the user when the second signal is received, where the second signal is a signal transmitted by the service device based on a second near field communication technology, and a maximum transmission range of the second signal is less than a maximum transmission range of the first signal.

The service device can transmit signals based on the second near field communication technology continuously or at a preset fixed time interval (for example, 0.5 second, 0.3 second, or 0.1 second). The second near field communication technology may be specifically NFC, may be IrDA (a point-to-point communication technology based on infrared ray, which is a wireless protocol developed by Infrared Data Association), or may be radio frequency identification (RFID).

The maximum transmission range of the transmitted signal transmitted based on the second near field communication technology is relatively short. For example, the maximum transmission range of an NFC signal is generally less than 0.1 m. For another example, the maximum transmission range of an RFID signal is also generally less than 0.1 m. For still another example, the maximum transmission range of an IrDA signal is generally less than 1 m. Therefore, when the terminal receives the signal transmitted by the second near field communication technology, it indicates that the terminal is close enough to the service device and is about to use the required service. At this time, the required service is recommended to the user.

It can be easily understood that, in the period from the time when the terminal receives the first signal to the time when the terminal receives the second signal, the service required by the user has been determined. That is, in step 204, the service recommended to the user is a service that has been determined in advance, so that the service arousal time is saved. Accordingly, the waiting time of the user is reduced, and the user experience is improved.

In an implementation, in step 204, entry information or a service page of the required service may be specifically displayed on a running interface of the application client to recommend the required service to the user.

The service page can be specifically a service card, for example, a bus code or a subway code.

The entry information can be specifically displayed in a form of an icon. For example, the entry information of a subway code can be displayed as a traffic card icon, and the user can click the icon to display the subway code.

In an example of this implementation, in step 204, the entry information or service page of the required service can be floated from one side of the application interface of the application client. For example, the entry information or service page can be floated from the top of the application interface, from the left of the application interface, from the right of the application interface, or from the bottom of the application interface.

In an example of this implementation, the entry information or service page of the required service can be specifically displayed in a message dialog box of the application client to recommend the required service to the user.

According to the solution provided in this implementation of the present specification, service arousal can be initiated in advance before the user uses the service; and when the user needs to use the service, the service can be recommended to the user in time, which reduces the waiting time of the user and improves the user experience.

In addition, in the solution provided in this implementation of the present specification, the service required by a user is not recommended to the user right after the service is determined, but only when the distance between the terminal held by the user and the service device is short enough. This avoids the influence of the entry information or service page of the service on the display interface of the terminal for a long period from the time when the terminal receives the first signal to the time when the user uses the service. For example, in the subway travel service scenario, the first signal may have been received at a subway entrance, but the user is using the application client for a video chat service. If the service page is displayed at this time, the user's video chat service will be affected, resulting in poor user experience.

Figure 1:
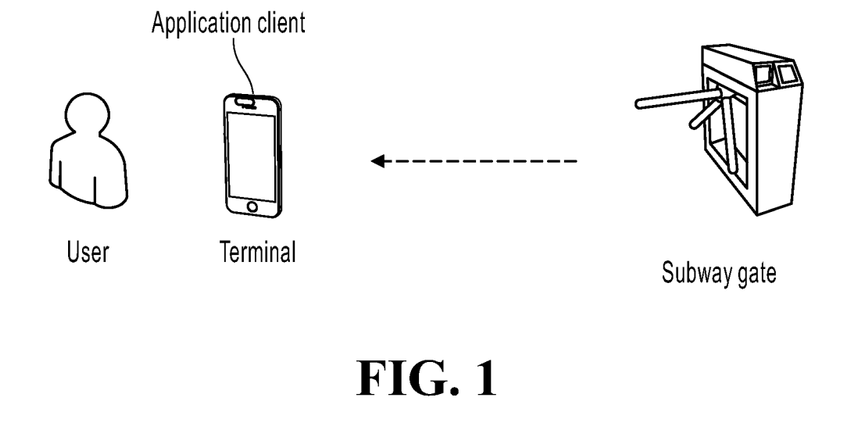
FIG. 1 is a schematic diagram illustrating an application scenario, according to an implementation.
Figure 3:
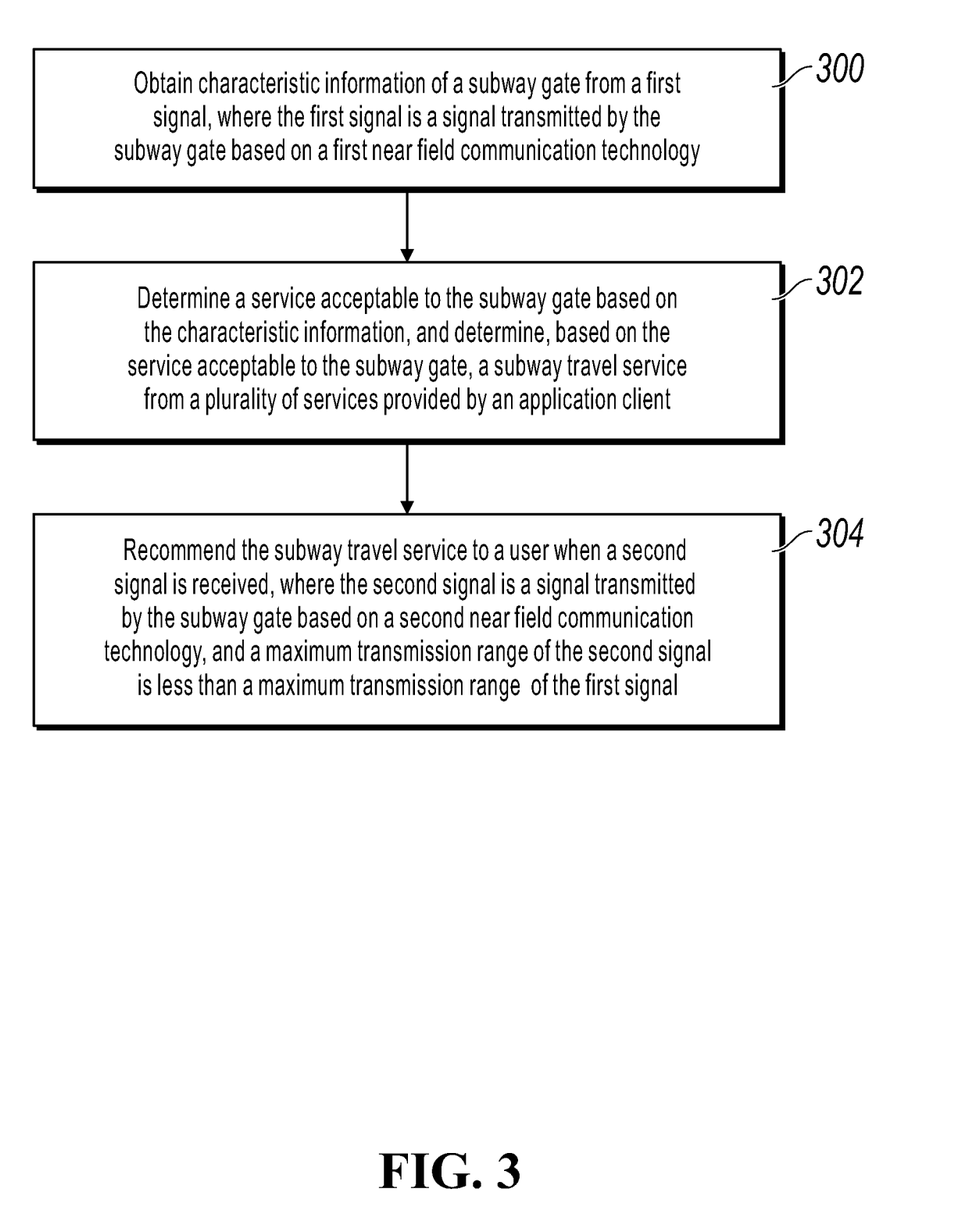
FIG. 3 is a flowchart illustrating a service arousing method, according to an implementation.

Next, in an implementation, the service arousing method provided in the implementation of the present specification is described in detail with reference to the scenario shown in FIG. 1, that is, the subway travel service scenario. In this implementation, the method may be performed by an application client such as a payment client installed on a terminal, and the terminal may be specifically a mobile terminal such as a mobile phone or a tablet computer. As shown in FIG. 3, the method includes: Step 300: Obtain characteristic information of a subway gate from a first signal, where the first signal is a signal transmitted by the subway gate based on a first near field communication technology; Step 302: Determine a service acceptable to the subway gate based on the characteristic information, and determine, based on the service acceptable to the subway gate, a subway travel service from a plurality of services provided by the application client; and Step 304: Recommend the subway travel service to the user when a second signal is received, where the second signal is a signal transmitted by the subway gate based on a second near field communication technology, and a maximum transmission range of the second signal is less than a maximum transmission range of the first signal.

Next, the previous steps are described in detail with reference to specific examples.

First, in step 300, the characteristic information of the subway gate is obtained from the first signal, where the first signal is a signal transmitted by the subway gate based on the first near field communication technology.

The subway gate can transmit signals based on the first near field communication technology continuously or at a fixed time interval (for example, 1 second, 0.5 second, or 0.3 second), where the signals carry the characteristic information of the subway gate.

The first near field communication technology may be Bluetooth (specifically Bluetooth low energy, two-way Bluetooth, iBeacon, etc.), Wi-Fi, ZigBee, etc. An effective transmission distance of a Bluetooth signal or a Wi-Fi signal is several meters to dozens of meters, and even hundreds of meters. An effective transmission distance of a ZigBee signal is tens of meters to hundreds of meters. Therefore, when the terminal is far away from the subway gate, for example, at the subway entrance, or just entered the subway check-in hall, the signal sent by the subway gate based on the first near field communication technology can be received, so that the application client can obtain the characteristic information of the subway gate, and then trigger arousal of the subway travel service.

When the application client on the terminal is in the running state (including the background running state), once the terminal receives the signal transmitted by the subway gate based on the first near field communication technology, the signal can be obtained. The signal is the first signal, and then the characteristic information of the subway gate is obtained from the signal.

If the terminal has received one or more signals transmitted based on the first near field communication technology, the application client is started. At this time, the first signal may be the signal that is transmitted based on the first near field communication technology signal and that is recently received after the application client is started.

In an example of this implementation, there is a correspondence between the subway gate and the application client; specifically, the same encryption rule is preset for both the subway gate and the application client. The subway gate can encrypt, based on the encryption rule, the signal transmitted based on the first near field communication technology. After obtaining the first signal, the application client can decrypt the first signal based on the encryption rule, and then the characteristic information of the subway gate can be obtained.

Next, in step 302, a service acceptable to the subway gate is determined based on the characteristic information, and the subway travel service is determined, based on the service acceptable to the subway gate, from a plurality of services provided by the application client.

The application client can identify the service acceptable to the subway gate based on the characteristic information of the subway gate, that is, the subway travel service.

It can be easily understood that when the terminal is located near a subway gate, the subway travel service is generally the service that the terminal user will use. Therefore, it is possible to determine, based on the service acceptable to the subway gate, the subway travel service from a plurality of services provided by the application client. Taking a payment client as an example, the payment client can support subway travel service, bus travel service, parking payment service, expressway toll service, living payment service, wealth management service, etc. When an ALIPAY client is located near a subway gate, the ALIPAY client can determine the subway travel service from a plurality of services supported by the ALIPAY client.

In step 304, the subway travel service is recommended to the user when a second signal is received, where the second signal is a signal transmitted by the local gate based on a second near field communication technology, and a maximum transmission range of the second signal is less than a maximum transmission range of the first signal.

The subway gate can transmit signals continuously or a fixed period of time (for example, 0.5 second, 0.3 second, or 0.1 second) based on the second near field communication technology. Specifically, the second near field communication technology can be NFC, IrDA, RFID, etc.

The maximum transmission range of the transmitted signal transmitted based on the second near field communication technology is relatively short. For example, the maximum transmission range of an NFC signal is generally less than 0.1 m. For another example, the maximum transmission range of an RFID signal is also generally less than 0.1 m. For still another example, the maximum transmission range of an IrDA signal is generally less than 1 m. Therefore, when the terminal receives a signal transmitted by the subway gate based on the second near-field communication technology, it indicates that the terminal is close enough to the subway gate and is about to use the subway travel service. At this time, the subway travel service is recommended to the user.

It can be easily understood that the subway travel service has been determined in a period between the time when the terminal receives the first signal and the time when the second signal is received. That is, in step 304, the service recommended to the user is a service that has been determined in advance, so that the service arousal time is saved. Accordingly, the waiting time of the user is reduced, and the user experience is improved.

In an example of this implementation, in step 304, the entry information or service page of the required service may be specifically displayed on the running interface of the application client to recommend the subway travel service to the user.

The service page can be specifically a subway travel service card, for example, a subway code.

The entry information can be specifically displayed in a form of an icon. For example, the entry information can be displayed as a traffic card icon, and the user can click the icon to display the subway code.

In an example of this implementation, in step 304, the entry information or service page of the subway travel service can be floated from one side of the application interface of the application client. For example, the entry information or service page can be floated from the top of the application interface, from the left of the application interface, from the right of the application interface, or from the bottom of the application interface.

In an example of this implementation, the entry information or service page of the subway travel service can be specifically displayed in the message dialog box of the application client to recommend the subway travel service to the user.

According to the solution provided in this implementation of the present specification, the subway travel service can be aroused in advance when the user is far away from the subway gate; and when the user is close to the subway gate and needs to swipe the card to enter the station, the subway travel service that has been aroused can be displayed in time, which reduces the waiting time of the user and improves the user experience.

In addition, in the solution provided in this implementation of the present specification, the subway travel service is not recommended to the user right after the subway travel service is determined, but only when the distance between the terminal held by the user and the subway gate is short enough. As such, the influence of the entry information or service page of the subway service on the display interface of the terminal can be avoided for a long period from the time when the terminal receives the first signal to the time when the user swipes the card to enter the station. For example, the first signal may have been received at a subway entrance, but the user is using the application client for a video chat service. If the service page is displayed at this time, the user's video chat service may be affected, resulting in poor user experience.

Figure 4:
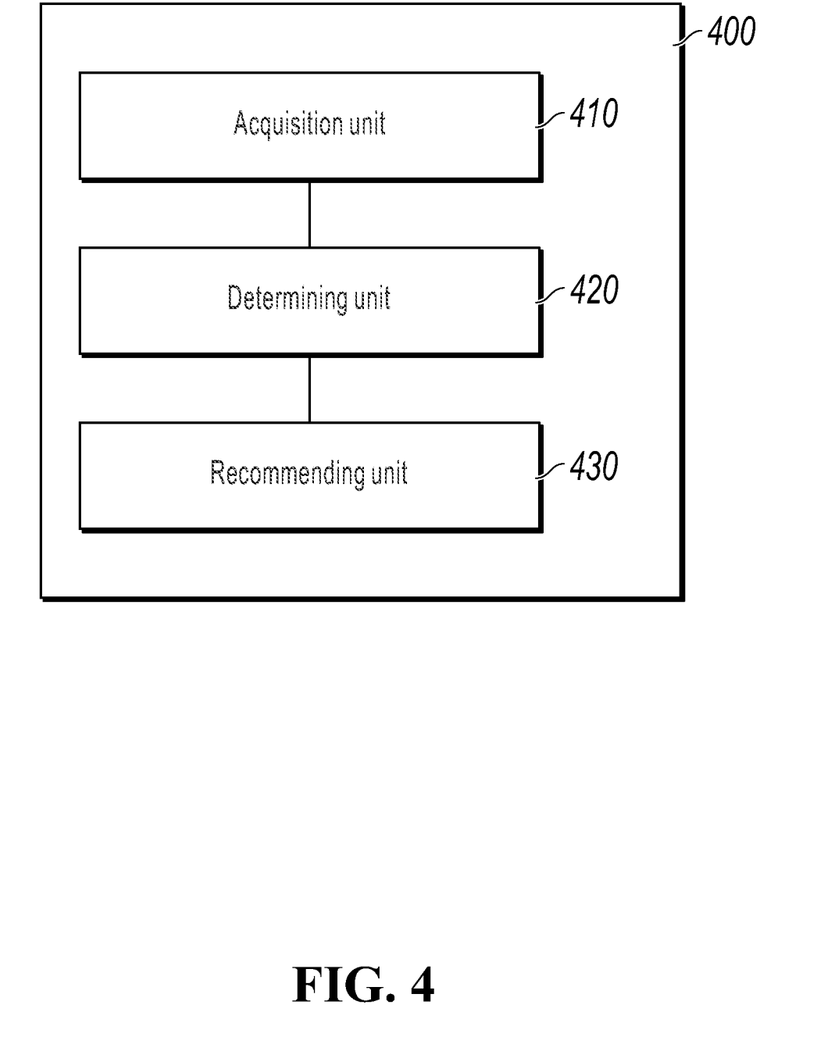
FIG. 4 is a schematic diagram illustrating a service arousing application client, according to an implementation.

According to a second aspect, an implementation of the present specification further provides an application client 400, where the client 400 is installed on a terminal. As shown in FIG. 4, the application client 400 includes: an acquisition unit 410, configured to obtain characteristic information of a service device from a first signal, where the first signal is a signal transmitted by the service device based on a first near field communication technology; a determining unit 420, configured to: determine a service acceptable to the service device based on the characteristic information, and determine, based on the service acceptable to the service device, the service required by the user from a plurality of services provided by the application client 300; and a recommending unit 430, configured to recommend the required service to the user when a second signal is received. The second signal is a signal transmitted by the service device based on a second near field communication technology, and a maximum transmission range of the second signal is less than a maximum transmission range of the first signal.

In an implementation, the first signal is one of the following types:

Bluetooth signal, Wi-Fi signal, or ZigBee signal.

In an implementation, the second signal is any one of the following types:

NFC signal, radio frequency identification signal, or IrDA signal.

In an implementation, the first signal is a signal encrypted based on a preset encryption rule, and the application client 400 is preset with the preset encryption rule; and the acquisition unit 410 is further configured to decrypt the first signal based on the preset encryption rule to obtain the characteristic information.

In an implementation, the recommending unit 430 is further configured to display entry information or a service page of the required service on a running interface of the application client.

In an example of this implementation, the recommending unit 430 is further configured to float the entry information or service page of the required service from a first side of the application interface, where the first side is any one of the following: top, left, right, or bottom.

In an implementation, the service device is any of the following types: subway gate, bus code reader, parking machine, or toll machine.

Each functional unit of the application client 400 may be implemented with reference to the method implementation shown in FIG. 2 or FIG. 3, and details are omitted here for simplicity.

According to the application client provided in the implementation of the present specification, service arousal may be initiated in advance before a user uses the service; and when the user needs to use the service, the service may be recommended to the user in time, which reduces the waiting time of the user and improves the user experience.

Further, an implementation of the present specification provides a computer readable storage medium, where the computer readable storage medium stores a computer program, and when the computer program is executed on a computer, the computer is enabled to perform the method shown in FIG. 2 or FIG. 3.

Further, an implementation of the present specification provides a computing terminal, including a memory and a processor, where the memory stores executable code, and when the processor executes the executable code, the method shown in FIG. 2 or FIG. 3 is implemented.

A person skilled in the field should be aware that, in one or more of the above examples, the functions described in the present invention can be implemented in hardware, software, firmware, or any combination thereof. When these functions are implemented by software, they can be stored in a computer readable medium or transmitted as one or more instructions or code lines on the computer readable medium.

The specific implementations mentioned above further describe the object, technical solutions and beneficial effects of the present invention. It should be understood that the previous descriptions are merely specific implementations of the present invention and are not intended to limit the protection scope of the present invention. Any modification, equivalent replacement and improvement made on the basis of the technical solution of the present invention shall fall within the protection scope of the present invention.

What is claimed is:

1. A computer-implemented method comprising:
   receiving, at a terminal, a first signal transmitted by a service device using a first wireless communication technology;
   obtaining, by an application client executing on the terminal, characteristic information of the service device from the first signal;
   responsive to obtaining the characteristic information, selecting, based on the characteristic information, a target service corresponding to the service device in preparation for displaying the target service on the terminal,
   wherein the target service is selected from a plurality of services provided by the application client on the terminal;
   receiving, at the terminal, a second signal transmitted by the service device using a second wireless communication technology, wherein a maximum transmission range of the second signal is less than a maximum transmission range of the first signal, and wherein the second wireless communication technology is different from the first wireless communication technology; and
   responsive to receiving the second signal, displaying the target service on the terminal.

2. The computer-implemented method of claim 1, wherein the first signal is one of the following types of signal: a Bluetooth signal, a Wi-Fi signal, or a ZigBee signal; and
   wherein the second signal is one of the following types of signal: NFC signal, radio frequency identification signal, or IrDA (Infrared Data Association) signal.

3. The computer-implemented method of claim 1, wherein selecting the target service comprises:
   initiating awakening of the target service.

4. The computer-implemented method of claim 1, wherein the first signal is encrypted based on a preset encryption rule, and wherein the application client is preset with the preset encryption rule, and wherein obtaining the characteristic information comprises:
   decrypting the first signal based on the preset encryption rule to obtain the characteristic information.

5. The computer-implemented method of claim 1, wherein displaying the target service on the terminal comprises:
   displaying an interactive entry icon or a service page of the target service on an interface of the application client.

6. The computer-implemented method of claim 5, wherein displaying the interactive entry icon or the service page of the target service comprises:
   floating, from a first side of the interface, the interactive entry icon or the service page of the target service, wherein the first side is one of the following:
   a top side, a left side, a right side, or a bottom side.

7. The computer-implemented method of claim 1, wherein the service device is one of the following types of service device:

a subway gate, a bus code reader, a parking machine, or a toll machine.

8. A non-transitory, computer-readable medium storing one or more instructions that, when executed by a computer system, cause the computer system to perform operations comprising:
   receiving, at a terminal, a first signal transmitted by a service device using a first wireless communication technology;
   obtaining, by an application client executing on the terminal, characteristic information of the service device from the first signal;
   responsive to obtaining the characteristic information, selecting, based on the characteristic information, a target service corresponding to the service device in preparation for displaying the target service on the terminal,
   wherein the target service is selected from a plurality of services provided by the application client on the terminal;
   receiving, at the terminal, a second signal transmitted by the service device using a second wireless communication technology, wherein a maximum transmission range of the second signal is less than a maximum transmission range of the first signal, and wherein the second wireless communication technology is different from the first wireless communication technology; and
   responsive to receiving the second signal, displaying the target service on the terminal.

9. The computer-readable medium of claim 8, wherein the first signal is one of the following types of signal: a Bluetooth signal, a Wi-Fi signal, or a ZigBee signal; and
   wherein the second signal is one of the following types of signal: NFC signal, radio frequency identification signal, or IrDA (Infrared Data Association) signal.

10. The computer-readable medium of claim 8, wherein selecting the target service comprises:
    initiating awakening of the target service.

11. The computer-readable medium of claim 8, wherein the first signal is encrypted based on a preset encryption rule, and wherein the application client is preset with the preset encryption rule, and wherein obtaining the characteristic information comprises:
    decrypting the first signal based on the preset encryption rule to obtain the characteristic information.

12. The computer-readable medium of claim 8, wherein displaying the target service on the terminal comprises:
    displaying an interactive entry icon or a service page of the target service on an interface of the application client.

13. The computer-readable medium of claim 12, wherein displaying the interactive entry icon or the service page of the target service comprises:
    floating, from a first side of the interface, the interactive entry icon or the service page of the target service, wherein the first side is one of the following:
    a top side, a left side, a right side, or a bottom side.

14. The computer-readable medium of claim 8, wherein the service device is one of the following types of service device:
    a subway gate, a bus code reader, a parking machine, or a toll machine.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, cause the one or more computers to perform one or more operations comprising:
    receiving, at a terminal, a first signal transmitted by a service device using a first wireless communication technology;
    obtaining, by an application client executing on the terminal, characteristic information of the service device from the first signal;
    responsive to obtaining the characteristic information, selecting, based on the characteristic information, a target service corresponding to the service device in preparation for displaying the target service on the terminal,
    wherein the target service is selected from a plurality of services provided by the application client on the terminal;
    receiving, at the terminal, a second signal transmitted by the service device using a second wireless communication technology, wherein a maximum transmission range of the second signal is less than a maximum transmission range of the first signal, and wherein the second wireless communication technology is different from the first wireless communication technology; and
    responsive to receiving the second signal, displaying the target service on the terminal.

16. The computer-implemented system of claim 15, wherein the first signal is one of the following types of signal: a Bluetooth signal, a Wi-Fi signal, or a ZigBee signal; and
    wherein the second signal is one of the following types of signal: NFC signal, radio frequency identification signal, or IrDA (Infrared Data Association) signal.

17. The computer-implemented system of claim 15, wherein selecting the target service comprises:
    initiating awakening of the target service.

18. The computer-implemented system of claim 15, wherein the first signal is encrypted based on a preset encryption rule, and wherein the application client is preset with the preset encryption rule, and wherein obtaining the characteristic information comprises:
    decrypting the first signal based on the preset encryption rule to obtain the characteristic information.

19. The computer-implemented system of claim 15, wherein displaying the target service on the terminal comprises:
    displaying an interactive entry icon or a service page of the target service on an interface of the application client.

20. The computer-implemented system of claim 19, wherein displaying the interactive entry icon or the service page of the target service comprises:
    floating, from a first side of the interface, the interactive entry icon or the service page of the target service, wherein the first side is one of the following:
    a top side, a left side, a right side, or a bottom side.

21. The computer-implemented system of claim 15, wherein the service device is one of the following types of service device:
    a subway gate, a bus code reader, a parking machine, or a toll machine.

* * * * *